United States Patent [19]
Heck et al.

[11] Patent Number: 5,444,865
[45] Date of Patent: Aug. 22, 1995

[54] GENERATING TRANSMIT INJECTION FROM RECEIVER FIRST AND SECOND INJECTIONS

[75] Inventors: Joseph P. Heck, Ft. Lauderdale, Fla.; David B. Ellingson, Bedford, Tex.

[73] Assignee: Motorola, Inc., Schaumburg, Ill.

[21] Appl. No.: 677,909

[22] Filed: Apr. 1, 1991

[51] Int. Cl.$^6$ .............................................. H04B 1/40
[52] U.S. Cl. ...................................... 455/86; 455/78
[58] Field of Search ...................... 455/76, 77, 85–87, 455/315, 118, 324, 83–84, 314, 73, 75, 78, 316, 83

[56] References Cited

U.S. PATENT DOCUMENTS

| | | | |
|---|---|---|---|
| 2,948,808 | 8/1960 | Neumann et al. | 455/85 |
| 3,519,740 | 7/1970 | Gassmann | 455/324 |
| 3,825,830 | 7/1974 | O'Connor et al. | |
| 4,450,583 | 5/1984 | Strobel et al. | 455/86 |
| 4,520,474 | 5/1985 | Vilmur | 455/87 |
| 4,811,425 | 3/1989 | Feerst | 455/317 |
| 5,003,621 | 3/1991 | Gailus | 455/324 |
| 5,123,008 | 6/1992 | Beesley | 455/86 |
| 5,222,253 | 6/1993 | Heck | 455/78 |
| 5,263,194 | 11/1993 | Ragan | 455/316 |

OTHER PUBLICATIONS

I. Daroff "A Bulk CMOS 40-Channel CB frequency synthesizer", Nov. 1977, pp. 518–521 (IEEE, vol. CE-23, No. 4).

*Primary Examiner*—Reinhard J. Eisenzopf
*Assistant Examiner*—Nguyen Vo
*Attorney, Agent, or Firm*—Pedro P. Hernandez; Barbara R. Doutre; M. Mansour Ghomeshi

[57] ABSTRACT

A radio transceiver includes a first local oscillator (114) which is preferably a synthesizer providing a first LO signal, and a second local oscillator providing a second LO signal. The radio further includes a first mixer (110) for mixing the received RF signal and the first LO signal to produce a first IF signal having a frequency which is the difference of the two inputs. The first IF signal is then mixed with the second LO signal by a second mixer (124) where a second IF signal is produced which is preferably at zero frequency. During transmission, the radio uses a conventional modulator to modulate the second LO signal which is then mixed with the first LO signal by a transmitter offset mixer (112), where the output is a modulated RF signal.

3 Claims, 1 Drawing Sheet

GENERATING TRANSMIT INJECTION FROM RECEIVER FIRST AND SECOND INJECTIONS

TECHNICAL FIELD

This invention relates generally to communication devices, and more specifically to radio transceivers.

BACKGROUND

In time domain multiplexed transceivers, and more specifically in time domain duplex (TDD) transceivers, transmission and reception of information is achieved almost simultaneously by alternating the transmission and reception of information over a very short interval of time. In TDD radios the information is transmitted and received over a single radio frequency channel with the transmissions being compressed in the order of 2:1 before being transmitted and the received information being expanded 2:1 in time prior to their reception. Transmission and reception cycles may be kept to approximately 1 ms in order to minimize fading effects, and noticeable system delays found in TDD systems. Time domain duplex transceivers are utilized on such systems as the second generation cordless telephone systems ("CT-2") and other systems which require the benefits of using time domain duplexing. A major technical design problem experienced when designing TDD transceivers is the time delays required in switching the synthesizer between transmit and receive frequencies. Normal synthesizer switching delays normally run in the vicinity of 3 milliseconds, which is much too great for TDD applications. A need exists in the art for a way of avoiding the inherent switching delays associated with synthesizers, and accomplishing high speed transmit and receive cycles such as those found in TDD applications.

SUMMARY OF THE INVENTION

The transceiver includes a first and second oscillator means for providing a first and second LO signals, respectively. A first mixer means having an RF input and a second input for receiving the first LO signal, and having an output for providing a first IF signal. The transceiver further includes a second mixer means having a first input for receiving the first IF signal, second input for receiving the second LO signal, and having an output for providing a second IF signal. Finally, a transmitter offset mixer means having a first input for receiving the first LO signal, a second input for receiving the second LO signal, and having an output for providing a modulated RF signal is included as part of the transceiver.

In one aspect of the invention, the receiver is a zero IF receiver having the first IF equalling the second LO signal which produces a zero frequency second IF.

DETAILED DESCRIPTION OF THE PREFERRED EMBODIMENT

Figure 1:
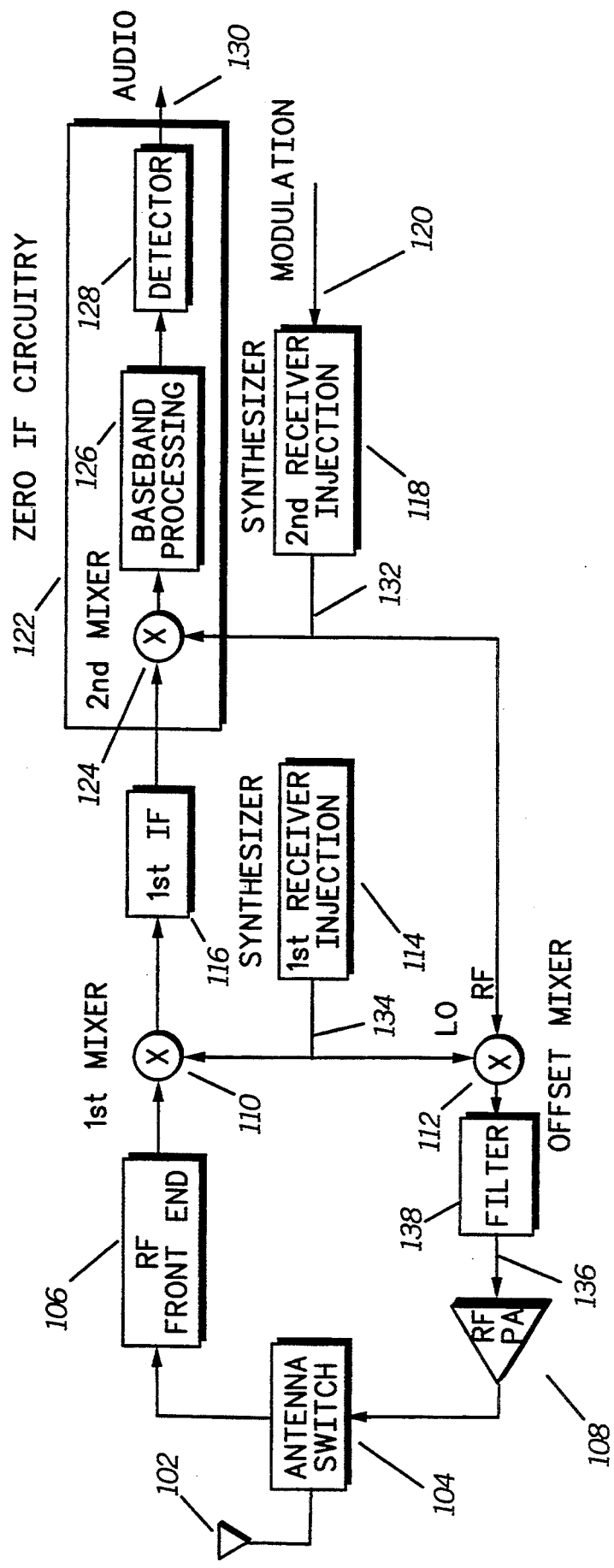
FIG. 1 shows a block diagram of a radio communications device in accordance with the present invention.

Referring to FIG. 1, there is shown a communication device such as a two way portable radio capable of operating in a time domain multiplexed mode (TDM) and more specifically in a time domain duplex (TDD) mode (2:1 compression and expansion ratios). The radio of FIG. 1 comprises an antenna 102 which is selectively coupled to receiver front end 106 or radio frequency power amplifier 108 via antenna switch 104. A controller such as a conventional microprocessor (not shown) controls the switching of antenna switch 104 between receiving and transmitting modes. When radio frequency (R.F.) signals are detected by antenna 102, the signals are sent to receiver front end 106 which is a conventional receiver front end as known in the art. Receiver front end 106 includes the receiver preselector, R.F. pre-amplifier, and other sections which are normally found in a modern receiver front end. A major function of the front end preamplifier stage is to provide for low noise amplification and also to provide for reverse isolation that reduces radiation back to antenna 102.

After the R.F. signal has passed through the receiver front end 106, the R.F. signal is coupled to the RF input of first mixer means 110, which is a conventional mixer having appropriate filtering. The first receiver injection circuit 114 is preferably part of the radio's synthesizer section (not shown) which produces a first locally generated (LO) signal which is coupled to the second input of mixer 110 via line 134. Mixer 110 then mixes the two signals together in order to get a resulting intermediate frequency (IF) signal output, that has a frequency equalling the difference between the frequency of the received R.F. signal and the frequency of the first LO signal which is produced by first receiver injection circuit 114. The resulting first intermediate frequency (IF) is then sent through IF filter section 116 where the signal is further filtered according to the particular receiver's design specifications. The first IF signal is then coupled to the input of zero IF circuitry 122 which is comprised of second mixer means 124, baseband processing circuit 126, and detector section 128.

In the zero IF circuit 122, the second mixer means 124, which is a conventional mixer circuit with appropriate filters, is coupled at one of its inputs to IF filter 116 in order to receive the first IF signal which is in turn mixed with the second LO signal produced by second receiver injection circuit 118. The second receiver injection circuit 118 is also preferably another conventional synthesizer as known in the art which is also part of the radio's synthesizer section. The resulting second IF which in this case is the difference of the two mixer inputs is at baseband or zero frequency. The output of second mixer 124 is then coupled to a conventional baseband processing circuit 126 which comprises filtering stages which filters the zero IF signal according to particular design specifications of the particular radio and further processes the signal. The resulting processed signal is then sent to a detector section 128 where the signal is demodulated and the resulting audio signal output is then sent to an audio stage (not shown) for presentation to the radio user, or in the case of data signals, sent to the radio's controller (not shown) for further manipulation.

When transmitting, the radio of FIG. 1 receives a modulation signal (i.e. audio signal) at line 120 which is inputted into the radio's modulation means or modulator which is part of the radio's synthesizer section. The modulator can be a linear, FM, AM, or other type of modulator as known in the art. The resulting modulated second LO signal is then inputted via line 132 into transmitter offset mixer means 112 where it is mixed with the first LO signal produced by first receiver injection circuit 114. Alternatively, instead of modulating the second LO signal as discussed above, the first LO signal could have been modulated instead.

Transmitter offset mixer 112 is a conventional mixer which has a resulting signal which is the sum or difference of the first LO signal and the modulated second LO signal which is generated by the second receiver injection 118, depending on the frequency selected for the first LO signal. The signal is then filtered by filter section 138 and the resulting output signal, or transmitter excitation signal, is then inputted via line 136 to a radio frequency power amplifier 108. The amplified R.F. signal is then sent to antenna switch 104 where it is routed to antenna 102.

The above mentioned discussion can be made clearer by taking a typical example of a simplex TDD radio operating at a frequency of 820 Mhz. If we assume that the 1st IF signal which is the product outputted by first mixer means 110 is to be set at 45 MHz, this will require the LO frequency from 1st receiver injection 114 to be at a frequency at either 775 MHz or 865 MHz since the first IF (45 MHz) is equal to the difference between the R.F. signal (820 MHz) and the first LO signal (either 865 MHz or 775 MHz), we will assume we chose to use 865 MHz for the first LO. Since we are using a zero IF receiver the second LO signal will also be set at approximately 45 MHz in order to make the resulting output (second IF) of second mixer means 124 equal to zero frequency or baseband. When transmitting, the modulated second LO signal (45 MHz) is mixed with the first LO signal by mixer 112 and the output is properly filtered by filter section 138 to produce an 820 MHz modulated RF signal. If the radio is to operate in a frequency range of 800–820 MHz the only requirement is to have the first receiver injection 114 work at a range of 845–865 MHz, while maintaining the second receiver injection 118 fixed at 45 MHz.

By having the 1st IF signal and the second LO signal both at one signal frequency, in this case 45 MHz, we avoid having to switch the second receiver injection circuit 118, in this case a synthesizer, during transmit and receive cycles. The present invention does not require having to offset the synthesizer frequencies during transmit and receive cycles as is normally the case in other dual conversion radios. In TDD radios in which the standard transmission and reception cycles are in the 1 millisecond range, avoiding the switching of the synthesizer, which tends to have frequency switching delays in the order of 3 milliseconds, is very important and is something the present invention accomplishes. By not having to switch the synthesizer frequency in a simplex mode of operation, the present invention allows a TDD radio to operate without having to worry about the normal synthesizer switching delays associated with the prior art. Since neither the first injection means 114, nor the second injection means 118, both of which are preferably synthesizers, need to switch frequencies when changing between receive and transmit cycles, the transmit to receive switching time is only limited by the antenna switch 104 delays and the tolerable RF PA 108 turn on and turn off times rather than by the synthesizer lock times associated with the prior art approaches. The transmit signal will exhibit the same stability and precision as the receiver section since the synthesizer can be locked to a single crystal reference.

Although the preferred embodiment has been shown as a linear modulated simplex TDD radio, one skilled in the art can realize that the present invention can operate as well using conventional FM since the modulation during radio transmissions is applied to the linear (RF) port of transmitter offset mixer 112. The present invention is also useful for simplex operation in conventional dual conversion topologies as well as the ZIF topology described in the preferred embodiment. In a conventional dual conversion embodiment not employing a zero IF receiver, either the first or second injection synthesizer frequency (circuit 114 or 118) is shifted by an amount equal to the 2nd IF frequency, typically about 500 Khz for most applications. This frequency shift would take place in the receive mode, but not in the transmit mode. Thus some change in LO frequency between receive and transmit modes is necessary when using a non-zero second IF. However, this would still simplify the first injection synthesizer since it would only have to cover a single frequency band rather than one for transmit and one for receive which is what would have to be done with the prior art.

What is claimed is:

1. A time domain multiplexed (TDM) radio transceiver having a transmitter and a zero intermediate frequency (IF) receiver and the transmitter and zero IF receiver operate at substantially the same frequency in both transmit and receive modes, comprising:

a first local oscillator (LO) means for providing a first LO signal for use in both transmit and receive modes;

a first mixer means having a radio frequency (RF) input, a second input for receiving the first LO signal, and having an output for providing a first IF signal;

a second local oscillator means for providing a second LO signal having substantially the same frequency as the first IF signal for use in both transmit and receive modes;

a second mixer means having a first input for receiving the first IF signal, a second input for receiving the second LO signal, and for providing a second IF signal; and a transmitter offset mixer means having a first input for receiving the first LO signal, a second input for receiving the second LO signal, and having an output for providing a modulated RF signal.

2. The radio transceiver of claim 1, wherein the radio transceiver is a time domain duplex (TDD) radio transceiver.

3. The radio transceiver of claim 1, further comprising a modulation means for modulating the second LO signal prior to the second LO signal being received by the transmitter offset mixer means.

* * * * *